United States Patent
Honda et al.

(10) Patent No.: US 6,879,558 B1
(45) Date of Patent: Apr. 12, 2005

(54) SWITCHING METHOD FOR BIDIRECTIONAL LINE SWITCHED RING AND NODE APPARATUS USED IN THE RING

(75) Inventors: Takashi Honda, Kawasaki (JP); Hiroshi Kanzawa, Kawasaki (JP); Junichi Moriyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 09/686,680

(22) Filed: Oct. 11, 2000

(30) Foreign Application Priority Data

Dec. 27, 1999 (JP) .......................... 11-371615

(51) Int. Cl.[7] .............................. H04L 12/26
(52) U.S. Cl. ..................................... 370/222
(58) Field of Search .............................. 370/216, 217, 370/221–225, 228

(56) References Cited

U.S. PATENT DOCUMENTS 6,269,452 B1 * 7/2001 Daruwalla et al. ............ 714/4
6,616,350 B1 * 9/2003 de Boer et al. ................ 398/9

FOREIGN PATENT DOCUMENTS

JP 6-268659 9/1994

* cited by examiner

*Primary Examiner*—Chi Pham
*Assistant Examiner*—Derrick W Ferris
(74) *Attorney, Agent, or Firm*—Katten Muchin Zavis Rosenman

(57) ABSTRACT

A switching method in a bidirectional line switched ring includes the steps of performing span switch by one node of the ring for getting rid of a fault detected by the one node, changing the span switch into ring switch when the span switch could not be performed normally, and performing the ring switch, and holding the ring switch request as an internal request of the one node when a span switch request, higher in priority than the ring switch, generated in another node is received by the one node.

12 Claims, 22 Drawing Sheets

FIG. 6A

| SYMBOL | K1 BYTE | | K2 BYTE | | |
|---|---|---|---|---|---|
| | BIT(1-4) | BIT(5-8) | BIT(1-4) | BIT(5) | BIT(6-8) |
| a 1 | N R | B | A | SHORT | IDLE |
| a 2 | N R | F | A | SHORT | IDLE |
| b 1 | N R | C | B | SHORT | IDLE |
| b 2 | N R | A | B | SHORT | IDLE |
| c 1 | N R | D | C | SHORT | IDLE |
| c 2 | N R | B | C | SHORT | IDLE |
| d 1 | N R | E | D | SHORT | IDLE |
| d 2 | N R | C | D | SHORT | IDLE |
| e 1 | N R | F | E | SHORT | IDLE |
| e 2 | N R | D | E | SHORT | IDLE |
| f 1 | N R | A | F | SHORT | IDLE |
| f 2 | N R | E | F | SHORT | IDLE |

FIG. 6B

| a 3 | S F - S | B | A | SHORT | IDLE |
|---|---|---|---|---|---|
| a 4 | S F - S | B | A | LONG | IDLE |
| a 5 | S F - R | B | A | SHORT | IDLE |
| a 6 | S F - R | B | A | LONG | IDLE |
| b 3 | S F - R | A | B | LONG | IDLE |
| b 4 | R R - R | A | B | SHORT | IDLE |
| b 5 | S F - R | A | B | LONG | Br&Sw |
| b 6 | R R - R | A | B | SHORT | Br&Sw |
| a 7 | S F - R | B | A | SHORT | Br&Sw |
| a 8 | S F - R | B | A | LONG | Br&Sw |

FIG. 10A

| SYMBOL | K1 BYTE | | K2 BYTE | | |
|---|---|---|---|---|---|
| | BIT(1-4) | BIT(5-8) | BIT(1-4) | BIT(5) | BIT(6-8) |
| d 3 | S F - S | C | D | LONG | IDLE |
| d 4 | S F - S | C | D | SHORT | IDLE |
| c 3 | R R - S | D | C | SHORT | Br |
| c 4 | S F - S | D | C | LONG | Br |
| d 5 | S F - S | C | D | LONG | Br&Sw |
| d 6 | S F - S | C | D | SHORT | Br&Sw |
| c 5 | R R - S | D | C | SHORT | Br&Sw |
| c 6 | S F - S | D | C | LONG | Br&Sw |
| d 7 | W T R | E | D | LONG | Br&Sw |
| d 8 | W T R | C | D | SHORT | Br&Sw |

FIG. 10B

| c 7 | R R - S | D | C | SHORT | Br&Sw |
|---|---|---|---|---|---|
| c 8 | W T R | D | C | LONG | Br&Sw |
| a 9 | S F - S | B | A | SHORT | IDLE |
| a 10 | S F - S | B | A | LONG | IDLE |
| b 7 | N R | C | B | SHORT | IDLE |
| b 8 | N R | A | B | SHORT | IDLE |

FIG. 13

| SYMBOL | K1 BYTE | | K2 BYTE | | |
|---|---|---|---|---|---|
| | BIT(1-4) | BIT(5-8) | BIT(1-4) | BIT(5) | BIT(6-8) |
| a 11 | S D − R | B | A | SHORT | Br&Sw |
| a 12 | S D − R | B | A | LONG | Br&Sw |
| b 9 | S D − R | A | B | SHORT | Br&Sw |
| b 10 | R R − R | A | B | LONG | Br&Sw |

FIG. 17

| SYMBOL | K1 BYTE | | K2 BYTE | | |
|---|---|---|---|---|---|
| | BIT(1-4) | BIT(5-8) | BIT(1-4) | BIT(5) | BIT(6-8) |
| f 3 | S F − R | A | F | SHORT | R D I |
| f 4 | S F − R | A | F | LONG | Br&Sw |
| a 11 | S F − R | B | A | SHORT | IDLE |
| a 12 | S F − R | B | A | LONG | IDLE |

FIG. 21

| SYMBOL | K1 BYTE | | K2 BYTE | | |
| --- | --- | --- | --- | --- | --- |
| | BIT(1-4) | BIT(5-8) | BIT(1-4) | BIT(5) | BIT(6-8) |
| f 5 | S F − S | A | F | SHORT | IDLE |
| f 6 | S F − S | A | F | LONG | IDLE |
| a 13 | S F − S | B | A | SHORT | IDLE |
| a 14 | R R − S | F | A | SHORT | Br |
| f 7 | S F − S | A | F | SHORT | Br&Sw |
| f 8 | S F − S | A | F | LONG | Br&Sw |
| a 15 | S F − S | F | A | LONG | Br&Sw |
| a 16 | R R − S | F | A | SHORT | Br&Sw |

SWITCHING METHOD FOR BIDIRECTIONAL LINE SWITCHED RING AND NODE APPARATUS USED IN THE RING

BACKGROUND OF THE INVENTION

1. Field of the Invention

The present invention relates to a switching method for a BLSR (Bidirectional Line Switched Ring) and a node apparatus used in the ring, and, in particular, to a switching method for a four-fiber BLSR and a node apparatus used in a four-fiber BLSR.

2. Description of the Related Art

A BLSR is a ring network system in which one time slot in a line is used by a plurality of paths, and another time slot is had as a spare in common by the plurality of paths, and, thereby, high line holding efficiency can be achieved.

In a 4-fiber BLSR configuration, there are two methods of recovering from a fault condition on ring. A first method is span switch using a short path between nodes between which a fault exists. A second method is ring switch using a long path. When span switch could not be performed, ring switch using a long path is performed so that recovery from the fault condition is achieved.

According to BELLCORE standard GR-1230-CORE Issue 4, R6-151 for SONET (Synchronous Optical Network) BLSR equipment generic criteria, it is prescribed to perform ring switch by SF (Signal Fail) or SD (Signal Degrade) when a notice of reception cannot be received by a short path from an adjacent node within a predetermined time after span switch by serious SF (that is, SF-S) or span switch by slight SD (that is, SD-S) is performed.

FIG. 1 illustrates span switch.

In the figure, in a node A, when a fault in a working line Wba is detected, a span switch SS2a of the node A and a span bridge SB1b of a node B are switched from the working line Wba to a protection line Pba, and, also, a span bridge SB2a of the node A and a span switch SS1b of the node B are switched from a working line Wab to a protection line Pab. Thus, a span switch operation is performed.

FIG. 2 illustrates ring switch.

In FIG. 2, when a fault in the working line Wba and a protection line Pba is detected in the node A, a ring switch RS2a and a ring bridge RB1a of the node A are switched so that output from the node A to the working line Wab is connected to a protection line Paf, and, also, input from a protection line Pfa is connected to the working line Wba of the node A. Also, a ring switch RS1b and a ring bridge RB2b of the node B are switched so that input from a protection line Pcb is connected to input from the working line Wab of a node A, and output from the node B to the working line Wba is connected to a proportion line Pbc. Thus, a ring switch operation is performed.

It is assumed that a case occurs where upon occurrence of a fault, span switch cannot be performed and therefore ring switch is performed. Then, after that, even when recovery is made from the situation in which span switch cannot be performed, it is not possible to know this fact of recovery, and to know a time when a check should be made to determine whether or not the recovery is achieved.

Once ring switch is performed, recovery from the fault condition is achieved. Accordingly, it is not necessary to perform span switch, and it is not necessary to always make a check to determine whether or not recovery is made from the situation in which span switch cannot be performed.

However, it is necessary to make a check to determine whether or not recovery is achieved from the situation in which span switch cannot be perform, when a fault occurs in another span, or switching will then be made by the reason why recovery is achieved from the situation in which span switch cannot be perform.

However, because a check operation for such a case is not prescribed, there may be an apparatus in which recovery can be made from a fault condition and an apparatus in which apparently recovery cannot be made from a fault condition, although recovery can actually be made in either apparatus. Accordingly, compatibility is degraded.

Further, during execution of ring switch, as a result of a lately made switching request having a high priority being performed, the contents of K1 and K2 bytes for transmitting/receiving a switching protocol, that is, APS (Automatic Protection Switch) information is not stabilized in the APS of overhead of SONET. Thereby, a switching operation is repeated, and an alarm of APS occurs.

SUMMARY OF THE INVENTION

The present invention has been made in consideration of the above-mentioned problems, and, an object of the present invention is to provide a switching method for a BLSR by which it is possible to stabilize APS information and switching operation.

According to the present invention, in a multi-fiber bidirectional line switched ring, span switch is performed by one node of the ring for getting rid of a fault detected by the one node;

the span switch is changed into ring switch when the span switch cannot be performed normally, and the ring switch is performed; and the ring switch request is held as internal request of the one node when span switch request, higher in priority than the ring switch, generated in another node is received by the one node.

Thus, when the span switch request generated in the other node higher in the priority than the ring switch is received by the one node, the ring switch is held as the internal request of the one node, and check as to whether recovery is achieved from a situation in which span switch cannot be performed is not made. Accordingly, it is possible to stabilize APS information and switching operation.

When information indicating that the span switch request higher in the priority has come to be absent is received by the one node, restart may be made from span switch for getting rid of the fault detected by the one node.

Thus, when the information indicating that the span switch request higher in the priority has come to be absent is received by the own node, restart is made from span switch to get rid of the fault of the own node. Accordingly, it is possible to make check as to whether or not recovery is achieved from the situation in which span switch cannot be performed, at the time span switch higher in the priority has come to be absent.

Ring switch according to a new fault alarm level may be performed when the fault alarm level received by the one node is changed into the new fault alarm level while the ring switch is on performance.

Thus, when the fault alarm level detected by the own node changes into another one during performance of ring switch, ring switch according to the other fault alarm level is performed, and switching between ring switch and span switch is not performed. Accordingly, it is possible to prevent useless switching operation from frequently occurring.

When, from another node adjacent on the side reverse to the side on which the ring switch is performed, ring switch request for the one node is received, the one node may be isolated from the ring.

Thus, when, from the node adjacent on the side reverse to the side on which the ring switch is performed, the ring switch request for the one node is received, the one node is isolated from the ring, and the ring switch is cancelled (a ring bridge and a ring switch are returned) by the one node. Accordingly, it is possible to stabilize APS information and switching operation.

When span switch request higher in the priority than the ring switch is received by the one node, the ring switch operation of the one node may be cancelled (a ring bridge and a ring switch may be returned), the received span switch request may be caused to pass through the one node so as to be transmitted to an adjacent node.

Thereby, it is possible to stabilize APS information and switching operation.

When span switch is attempted to be performed between the one node and each of adjacent nodes on both sides, but the span switch between the one node and the one adjacent node cannot be performed so as to be changed into ring switch, comparison of the priority between the span switch request for the other adjacent node and the ring switch request for the one adjacent node may be made by the one node so as to determine whether the span switch or ring switch is to be performed, and request may be made to the adjacent nodes on both sides based on the result of the determination.

Thereby, it is possible to stabilize APS information and switching operation.

Other objects and further features of the present invention will become more apparent from the following detailed description when read in conjunction with the accompanying drawings.

BRIEF DESCRIPTION OF THE DRAWINGS

FIGS. 6A and 6B show lists of APS information in the first embodiment at a time of fault occurring between the nodes A and B according to the present invention;

FIGS. 10A and 10B show lists of APS information in the second embodiment at a time of fault occurring between the nodes C and D according to the present invention;

FIG. 13 shows a list of APS information in the third embodiment at a time of fault occurring between the nodes A and B according to the present invention;

FIG. 17 shows a list of APS information in the fourth embodiment at a time of fault occurring between the nodes A and F according to the present invention;

FIG. 21 shows a list of APS information in the fifth embodiment at a time of fault occurring between nodes A and F according to the present invention.

DETAILED DESCRIPTION OF THE PREFERRED EMBODIMENTS

Figure 1:
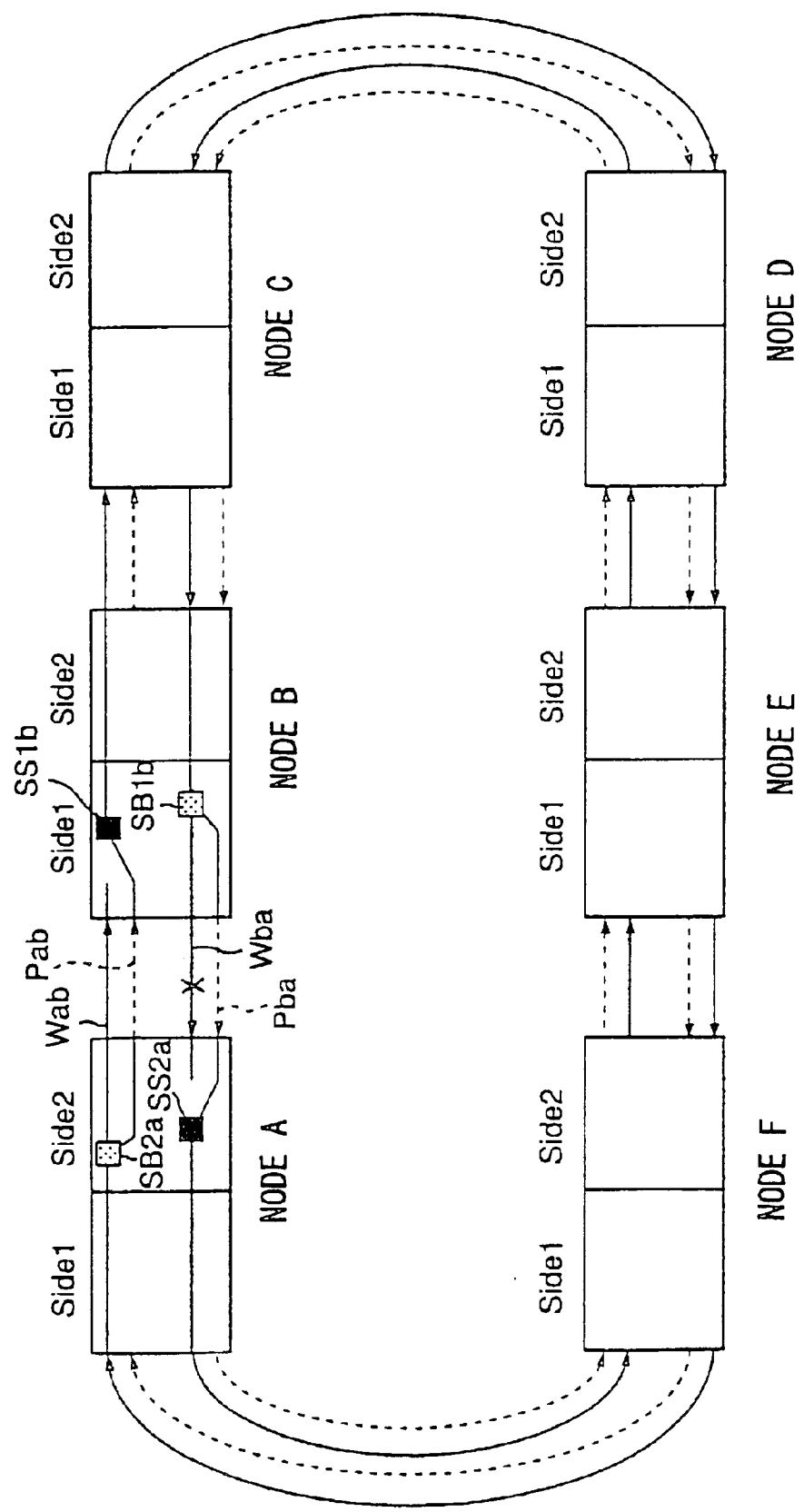
FIG. 1 illustrates span switch.
Figure 2:
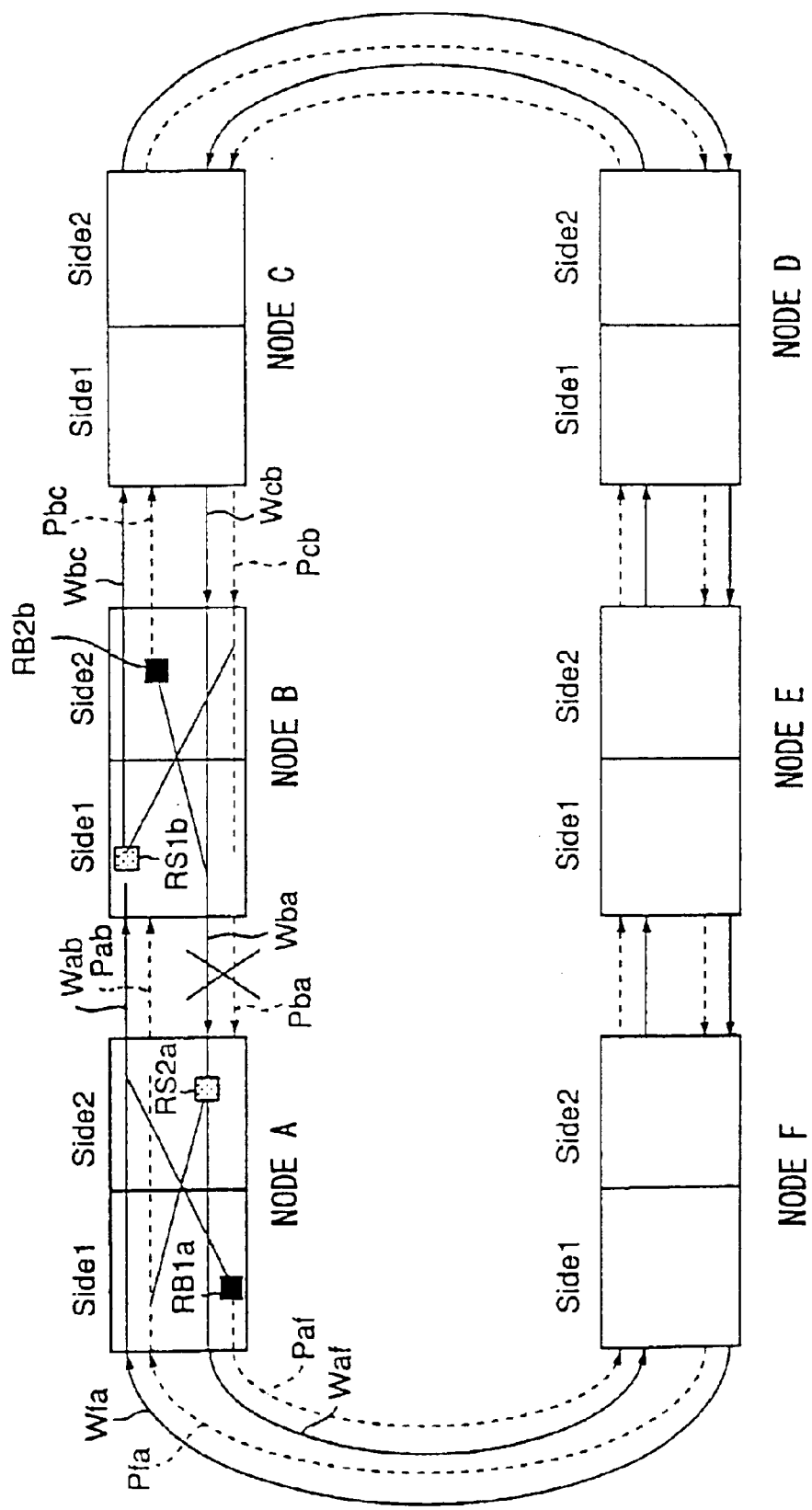
FIG. 2 illustrates ring switch.
Figure 3:
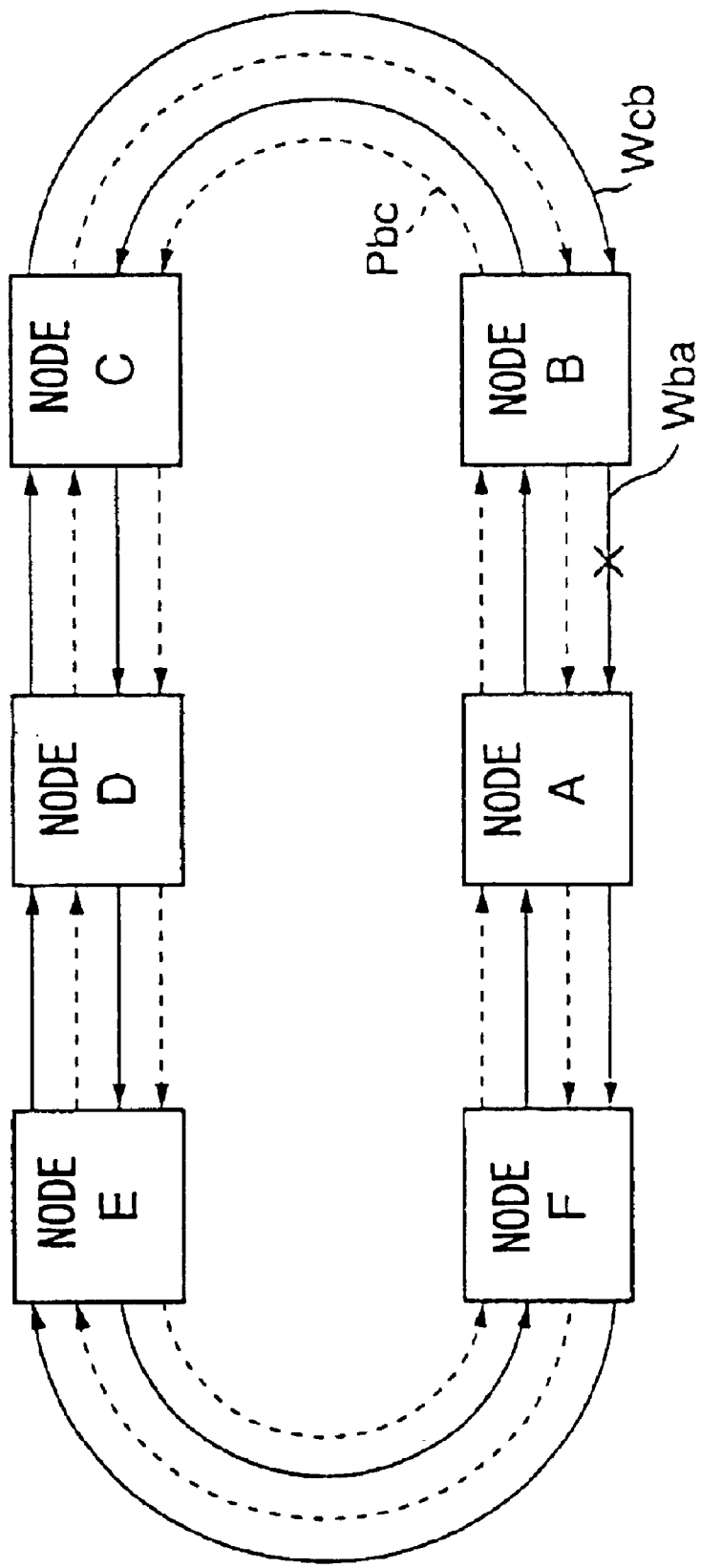
FIG. 3 shows a configuration of ring network (BLSR) to which methods according to the present invention are applied.

FIG. 3 shows a configuration diagram of a ring network (BLSR) to which the present invention is applied.

As shown in the figure, six nodes A, B, C, D, E and F are connected to form a ring by optical fibers shown by arrows of solid lines and broken lines. The arrows express information transmission directions. The solid lines represent working lines while broken lines represent protection lines.

In this configuration, there are two possible paths from the node A to the node B, i.e., a short path from the node A to the node B directly and a long path from the node A to the node A via the nodes F, E, D and C passed through in the stated order.

Figure 4:
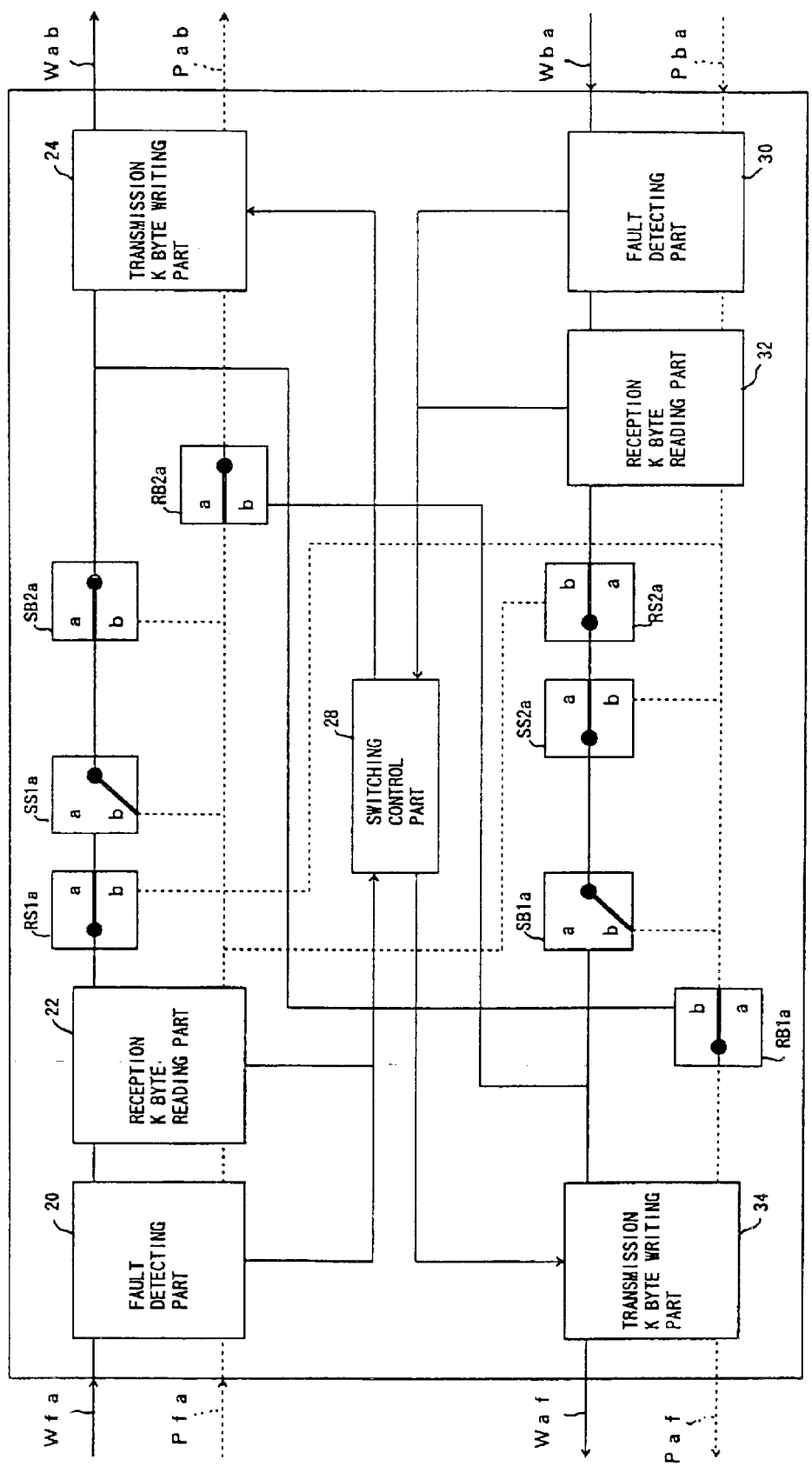
FIG. 4 shows a block diagram of a node according to the present invention.

FIG. 4 shows a block diagram of a node in any embodiment of the present invention which will be described later. For example, description will be made assuming that the node shown in FIG. 4 is the node A shown in FIG. 3.

In FIG. 4, a fault detecting part 20 detects a fault in each of the working line Wfa and protection line Pfa, and supplies the detection result to a switching control part 28.

A reception K byte reading part 22 reads APS information from a time slot received from each of the working line Wfa and protection line Pfa and supplies the thus-read information to the switching control part 28.

In an ordinary condition in which no fault occurs, through control by the switching control part 28, each of ring switch RS1a, span switch SS1a, span bridge SB2a and ring bridge RB2a is made to enter a condition in which a terminal 'a' is selected.

The time slot received from the working line Wfa passes through the ring switch RS1a, span switch SS1a and span bridge SB2a, is supplied to a transmission K byte writing part 24 and a terminal 'b' of a ring bridge RB1a, and, in the transmission K byte writing part 24, has APS information supplied from the switching control part 28 written thereto, and is sent out to a working line Wab.

The time slot received from the protection line Pfa passes through the ring bridge RB2a and is supplied to the transmission K byte writing part 24, and, also, is supplied to terminals 'b' of the span switch SS1a, span bridge SB2a and a ring switch RS2a, and, in the transmission K byte writing part 24, has APS information supplied from the switching control part 28 written thereto, and is sent out to a protection line Pab.

A fault detecting part 30 detects a fault in each of a working line Wba and a protection line Pba, and supplies the detection result to the switching control part 28.

A received K byte reading part 32 reads APS information from a time slot received from each of the working line Wba and protection line Pba, and supplies the thus-read information to the switching control part 28.

In an ordinary condition in which no fault occurs, through control by the switching control part 28, each of ring switch RS2a, span switch SS2a, span bridge SB1a and ring bridge RB1a is made to enter a condition in which a terminal 'a' is selected.

The time slot received from the working line Wba passes through the ring switch RS2a, span switch SS2a and span bridge SB1a, is supplied to a transmission K byte writing part 34 and a terminal 'b' of the ring bridge RB2a, and, in the transmission K byte writing part 34, has APS information supplied from the switching control part 28 written thereto, and is sent out to a working line Waf.

The time slot received from the protection line Pba passes through the ring bridge RB1a and is supplied to the transmission K byte writing part 34, and, also, is supplied to terminals 'b' of the span switch SS2a, span bridge SB1a and ring switch RS1a, and, in the transmission K byte writing part 34, has APS information supplied from the switching control part 28 written thereto, and is sent out to a protection line Paf.

At a time span switch is performed, through control by the switching control part 28 for example, each of the span switch SS1a and span bridge SB1a is made to enter a condition in which the terminal 'b' is selected. Thereby, a time slot received from the protection line Pfa passes through the span switch SS1a and span bridge SB2a and is sent out to the working line Wab, while a time slot received from the working line Wba passes through the ring switch RS2a, span switch SS2a, span bridge SB1a and ring bridge RB1a, and is sent out to the protection line Paf.

At a time ring switch is performed, through control by the switching control part 28, for example, each of the ring switch RS2a and ring bridge RB1a is made to be in a condition in which the terminal 'b' is selected. Thereby, a time slot received from the protection line Pfa passes through the ring switch RS2a, the span switch SS2a and span bridge SB1a and is sent out to the working line Waf, while a time slot received from the working line Wfa passes through the ring switch RS1a, span switch SS1a, span bridge SB2a and ring bridge RB1a, and is sent out to the protection line Paf.

It is noted that priority of switching request is, from the higher one to the lower one, span switch by SF (SF-S), ring switch by SF (SF-R), span switch by SD (SD-S) and ring switch by SD (SD-R).

Figure 5:
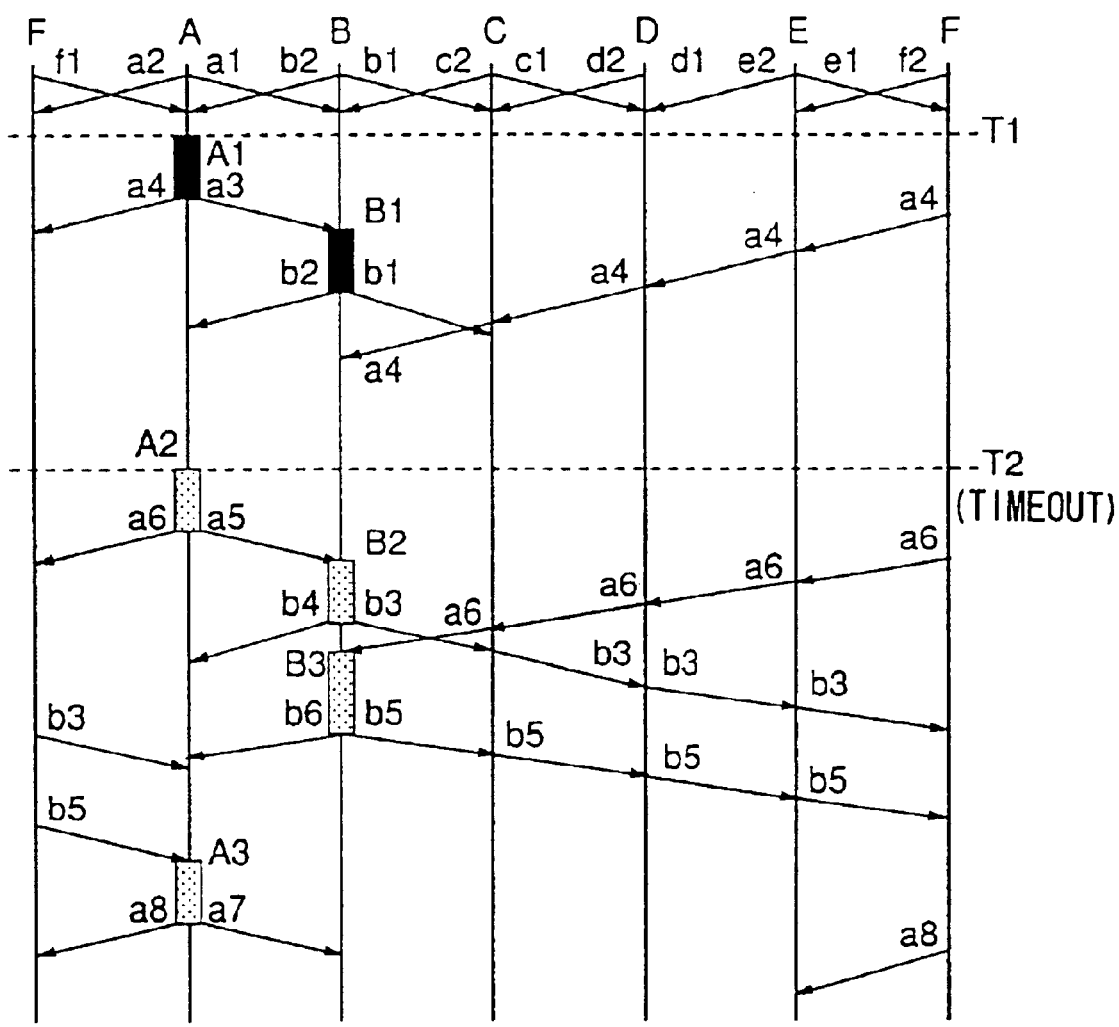
FIG. 5 shows an operation sequence in a first embodiment at a time of fault occurring between nodes A and B according to the present invention.

FIG. 5 shows an operation sequence in a first embodiment at a time a fault occurs between the nodes A and B according to the present invention. FIGS. 6A and 6B show lists of APS information at the time.

It is assumed that no fault exists in the ring as an initial condition. FIG. 6A shows the APS information at this time.

In FIGS. 6A and 6B, the first column indicates a symbol specifying APS information. K1 byte, first through fourth bits of the second column indicate switching request, but 'NR' represents 'no request'. K1 byte, fifth through eighth bits of the third column indicate a transmission destination of the APS information. K2 byte, first through fourth bits of the fourth column indicate a transmission source of the APS information. K2 byte, fifth bit of the fifth column indicates short span by the value '0' and long span by the value '1'. K2 byte, sixth through eighth bits of the sixth column indicate a status of the transmission source.

Then, it is assumed that a serious fault occurs in the working line Wba between the nodes A and B as indicated by 'X' in FIG. 3. Then, at the time T1 shown in FIG. 5, the node A detects SF (Signal Fail) in the working line from the node B. Then, the node A transmits to the adjacent nodes B and F, APS information a3 and a4 (shown in FIG. 6B) of span switch by SF (SF-S) for the node B.

In response thereto, the node B returns APS information b2 of 'NR' shown in FIG. 6A, and there is no change in the APS information received by the node A. That is, the node A receives neither a response (RR-R) to the span switch nor another switching request from the node B. The reason why no response is made to the span switch is that a fault exists in the protection line Pba between the nodes A and B, or the span switch cannot be performed due to an internal condition of the node B, or the like.

Then, while there is no change in the situation, a predetermined time has elapsed after the node A transmitted SF-S, and the time T2 is reached. Thereby, the node A determines that performance of the span switch (SF-S) with the node B is not possible, transmits APS information a5 and a6 shown in FIG. 6B, and performs ring switch by SF (SF-R).

At this time, according to ordinary switching sequence, the request of the APS information a6 is caused to pass through the nodes F, E, D and C, and reaches the node B.

When the node B receives the APS information a6, the node B performs ring switch (operates the ring bridge and ring switch). Thus, the working line Wba from the node B to the node A is switched to be connected to the protection line Pbc from the node B to the node C. Then, the node B transmits APS information b5 and b6 of response shown in FIG. 6B for the node A.

Further, when the node A receives the APS information b5 of response from the node B via the node F through the long span, the node A performs ring switch (operates the ring bridge and ring switch), and transmits APS information a7 and a8 of response.

The above-described operation is an ordinary one described in the standard GR-1230-CORE, Issue 4.

Figure 7:
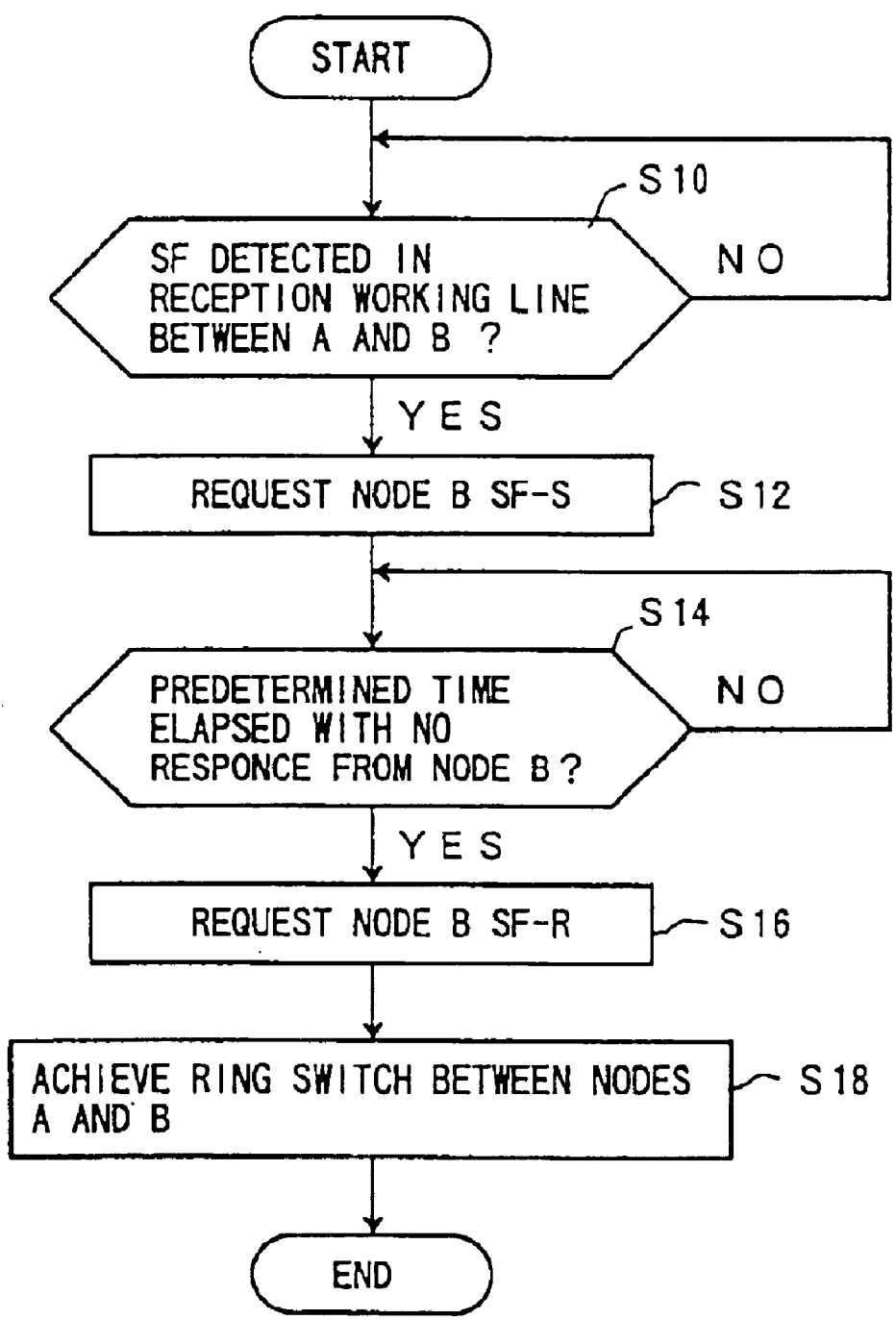
FIG. 7 shows a flow chart performed by the node A at a time of fault occurring between the nodes A and B according to the present invention.

FIG. 7 shows a flow chart of a process which the node A performs when a fault occurs between the nodes A and B.

In FIG. 7, in a step S10, the node A determines whether or not SF is detected in the working line from the node B. When SF is detected, a step S12 is performed, and the node A requests span switch by SF (SF-S) of the node B.

Then, in a step S14, the node A determines whether or not a predetermined time has elapsed without response given from the node B. When the predetermined time has elapsed, a step S16 is performed. In the step S16, the node A requests ring switch by SF (SF-R) of the node B, and achieves the ring switch between the nodes A and B in a step S18.

Figure 8:
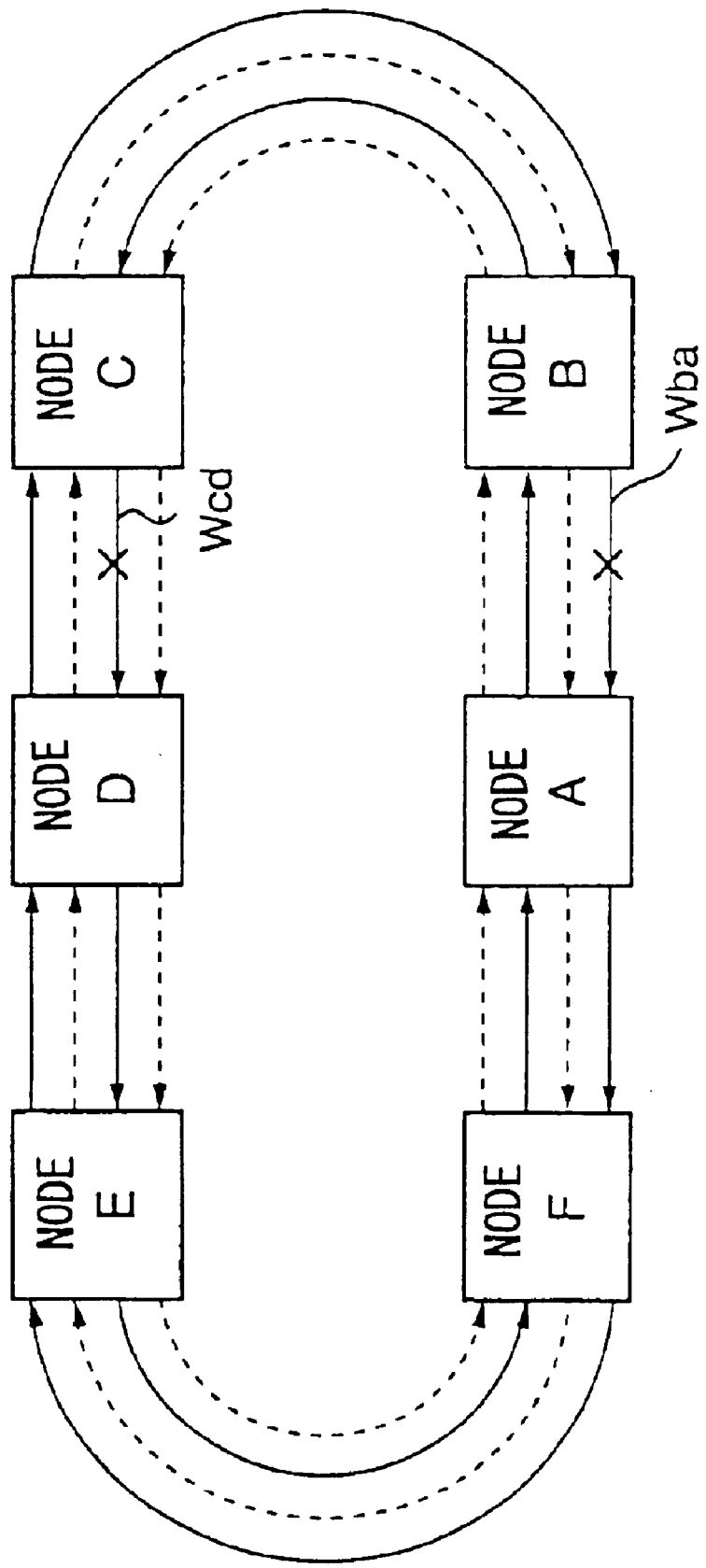
FIG. 8 shows the configuration shown in FIG. 3 but also having another line fault.
Figure 9:
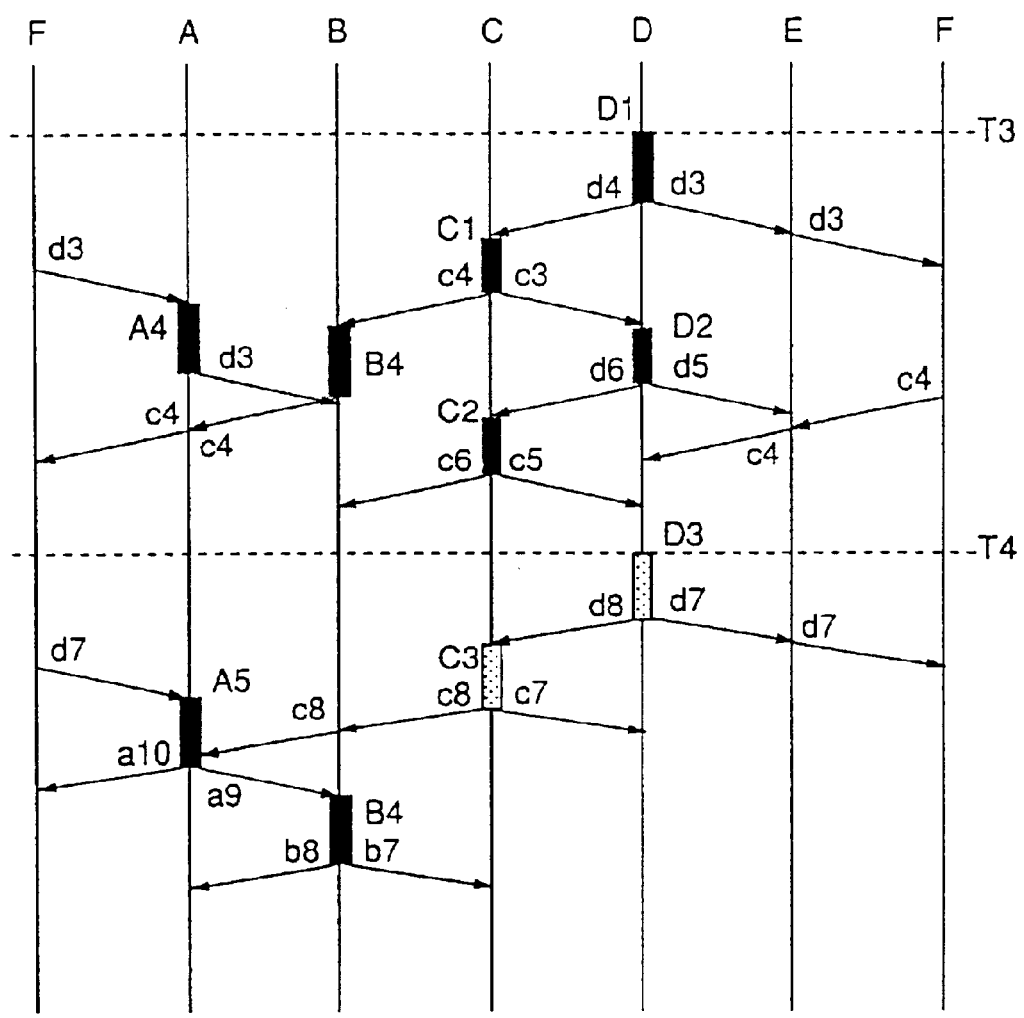
FIG. 9 shows an operation sequence in a second embodiment at a time of fault occurring between nodes C and D according to the present invention.

Then, it is assumed that a serious fault then also occurs between the nodes C and D indicated by 'X' in the working line Wcd as shown in FIG. 8. FIG. 9 shows an operation sequence in a second embodiment performed when the fault occurs between the nodes C and D according to the present invention. FIGS. 10A and 10C show lists of APS information in this case.

At the time T3 shown in FIG. 9, the node D detects SF in the working line from the node C. Then, the node D transmits APS information d3 and d4 (shown in FIG. 10A) of span switch by SF (SF-S) for the node C to the adjacent nodes C and E. In response thereto, the node C performs span switch (operates the span bridge), and transmits APS information c3 of response RR-S and APS information of span switch by SF (SF-S) shown in FIG. 10A.

Further, when receiving the APS information c3, the node D performs span switch (operates the ring bridge and ring switch), and transmits APS information d5 and d6 of span switch by SF (SF-S) shown in FIG. 10A. When receiving the APS information d6 of span switch (SF-S), the node C performs span switch, and transmits APS information c5 of response RR-S and APS information c6 of span switch by SF (SF-S).

Further, when receiving the APS information d3 (or c4) of SF-S request from the node D to node C through long path while performing the ring switch (SF-R), the node A cancels the ring switch (returns the ring bridge and ring switch) because SF-R is lower than SF-S in the priority.

Then, the node A causes the received APS information d3 (or c4) of SF-S request to pass therethrough. However, the node A holds SF-R as internal request thereof.

Similarly, the node B cancels the ring switch (returns the ring bridge and ring switch) when receiving the APS information c4 (or d3) of SF-S request through long path from the node C to node D.

When the node D detects no SF in the working line from the node C and enters a waiting condition WTR at the time T4 shown in FIG. 9, the node D transmits APS information d7 and d8 (shown in FIG. 10A) of waiting WTR for the node C to the adjacent nodes C and E, respectively.

The node C receives the APS information d8, and transmits APS information c7 of response RR-S and APS information c8 of waiting condition WTR shown in FIG. 10B for the node D.

The node A, while detecting that SF exists in the working line from the node B, receives the APS information d7 of waiting WTR transmitted from the node D for the node C, determines that the condition is such that request of the own node can be performed, and performs span switch (SF-S).

Although the request held in the node A as the internal request is SF-R, the node A restarts from span switch (SF-S) which can be performed at the present situation because the fault in the other location is already got rid of.

Then, the node A transmits APS information a9 and a10 of span switch (SF-S) shown in FIG. 10B. In response thereto, the node B transmits APS information b7 and b8 of no request NR shown in FIG. 10B to the nodes C and A.

Figure 11:
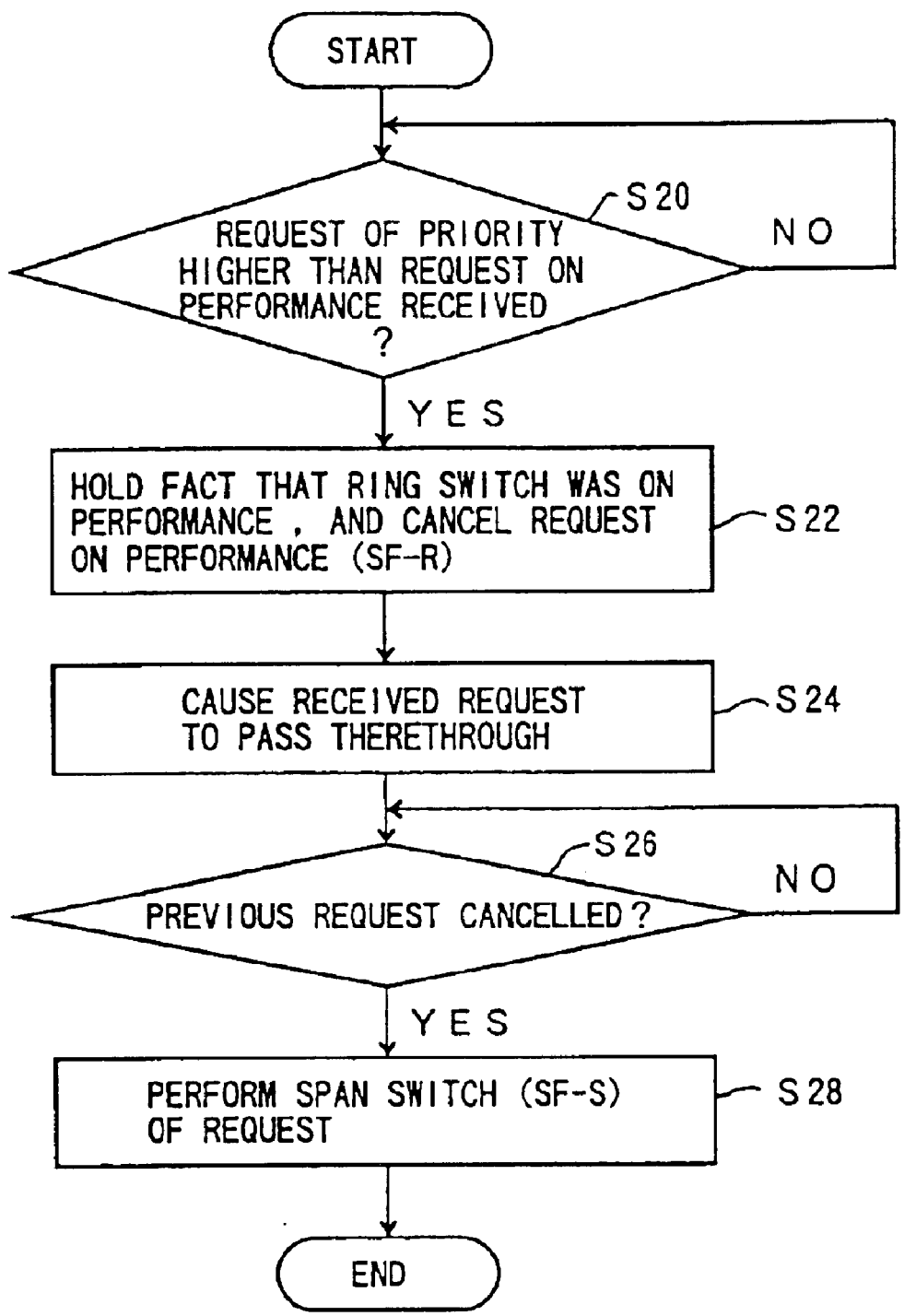
FIG. 11 shows a flow chart performed by the node A at a time of fault occurring between the nodes C and D during performance of ring switch between the nodes A and B according to the present invention.

FIG. 11 shows a flow chart of a process performed by the node A when a fault occurs between the nodes C and D during performance of ring switch between the nodes A and B.

In FIG. 11, in a step S20, the node A determines whether or not APS information of request for another node (for example, SF-S from the node C for the node D) higher in the priority than request of ring switch (SF-R) which is performed by the own node is received.

When the APS information of the above-mentioned request is received, the node A cancels the ring switch (SF-R) in a step S22, and causes the received APS information of the request to pass therethrough in a step S24.

However, the fact that the ring switch (SF-R) was performed by the own node is held in the step S22.

Then, in a step S26, the node A determines whether or not APS information (for example, waiting WTR from the node D for the node C) for canceling request (for example, SF-S from the node C for the node D) which previously results in cancellation of the ring switch (SF-R) is received.

When this is received, a step S28 is performed, and the node A performs span switch (SF-S) for dealing with the situation in which the serious SF exists between the nodes A and B although the fact that the ring switch (SF-R) was performed by the own node is held.

Thus, when span switch request generated in another node higher in the priority than ring switch is received by the own node, the ring switch request is held as internal request of the own node, and a check as to whether or not recovery is achieved from the situation in which span switch cannot be performed is not made. Accordingly, it is possible to stabilize APS information and switching operation.

Further, when information indicating that span switch request higher in the priority has come to be absent is received by the own node, restart is made from span switch for getting rid of the fault of the own node. Accordingly, it is possible to make a check as to whether or not recovery is achieved from the situation in which span switch cannot be performed at the time span switch higher in the priority has come to be absent. Thereby, it is possible to achieve recovery from many faults.

Further, when span switch request higher in the priority is received by the own node, the ring switch operation of the own node is cancelled (the ring bridge and ring switch are returned), and the received span switch request is passed through the own node and is transmitted to adjacent node. Accordingly, it is possible to stabilize APS information and a switching operation.

Figure 12:
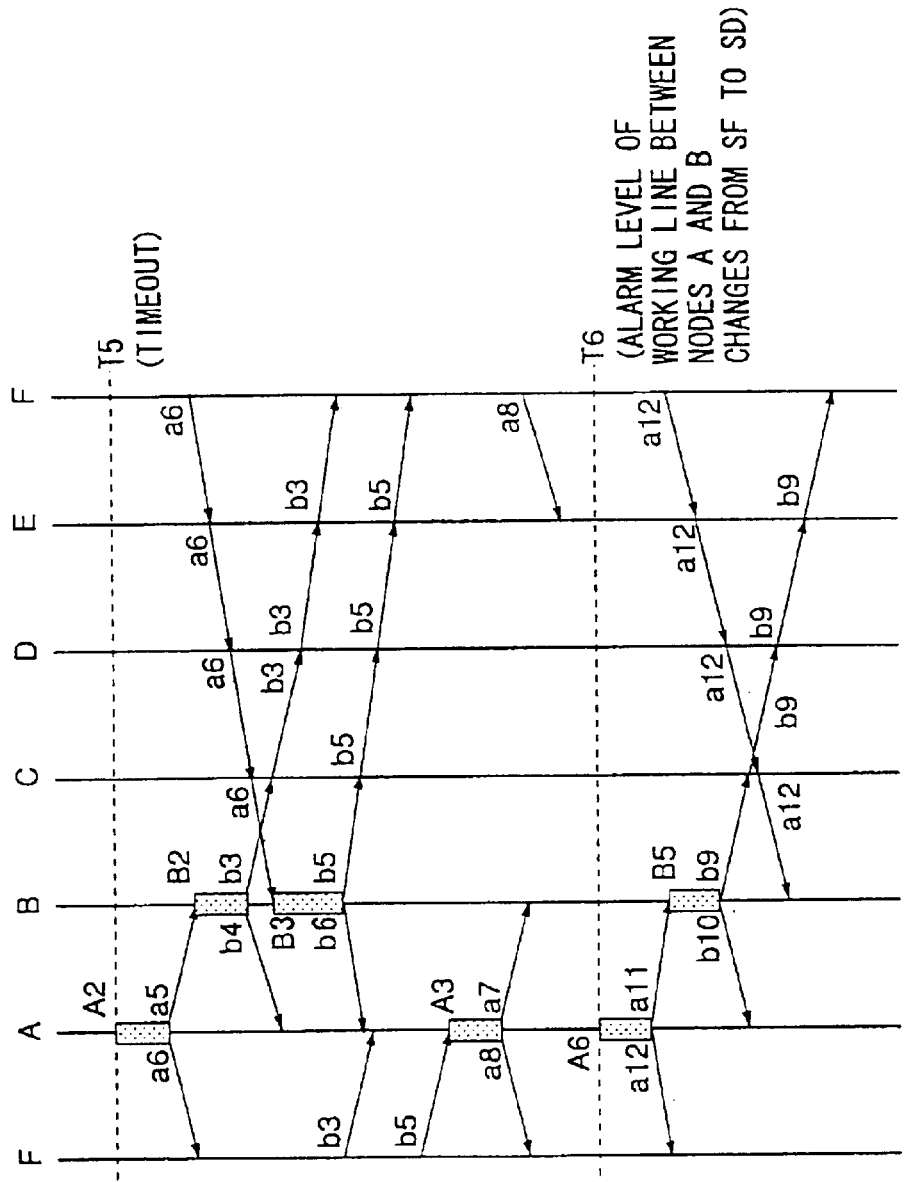
FIG. 12 shows an operation sequence in a third embodiment at a time of fault occurring between the nodes A and B according to the present invention.

FIG. 12 shows an operation sequence performed when a fault occurs between the nodes A and B in a third embodiment of the present invention. FIG. 13 shows a list of APS information in this case. In the third embodiment, a detection alarm level of the working line Wba of the node A changes from serious SF into slight SD.

The node A transmits APS information a9 and a10 of span switch (SF-S), then a predetermined time has elapsed, and, then, the time T5 is reached shown in FIG. 12. When neither APS information of response RR-S to SF-S from the node B nor other span switch request has been received until the predetermined time has elapsed, ring switch is performed in the operation same as that of the case where the time T2 is reached shown in FIG. 5.

That is the node A determines that span switch (SF-S) with the node B is not possible of performance, transmits APS information a5 and a6 shown in FIG. 6B, and performs ring switch by SF (SF-R). At this time, in the ordinary switching sequence, the request of APS information a6 is caused to pass through the nodes F, E, D and C, and reaches the node B.

When the node B receives this APS information a6, the node B performs ring switch (operates the ring bridge and ring switch), and switches the working line Wcb from the node C toward the node B to connect it to the protection line Pbc from the node D toward the node C. Then, the node B transmits APS information b5 and b6 of response shown in FIG. 6B for the node A.

When the node A receives the APS information b5 of response from the node B via the node F through long span, the node A performs ring switch (operates thew ring bridge and ring switch), and transmits APS information a7 and a8 of response thereto.

Then, at the time T6, when the detection alarm level of working line Wba from the node B in the node A changes from serious SF to slight SD, the node A continues the ring switch on performance, changes the switching request into SD-R, transmits APS information a11 and a12 of switching request shown in FIG. 13 and thus transmits ring switch by SD (SD-R).

When receiving the APS information a11 from the node A, the node B performs ring switch by SD (SD-R), and transmits APS information b9 of switching request and APS information b10 of response RR-R shown in FIG. 13, to the nodes C and A, respectively.

Figure 14:
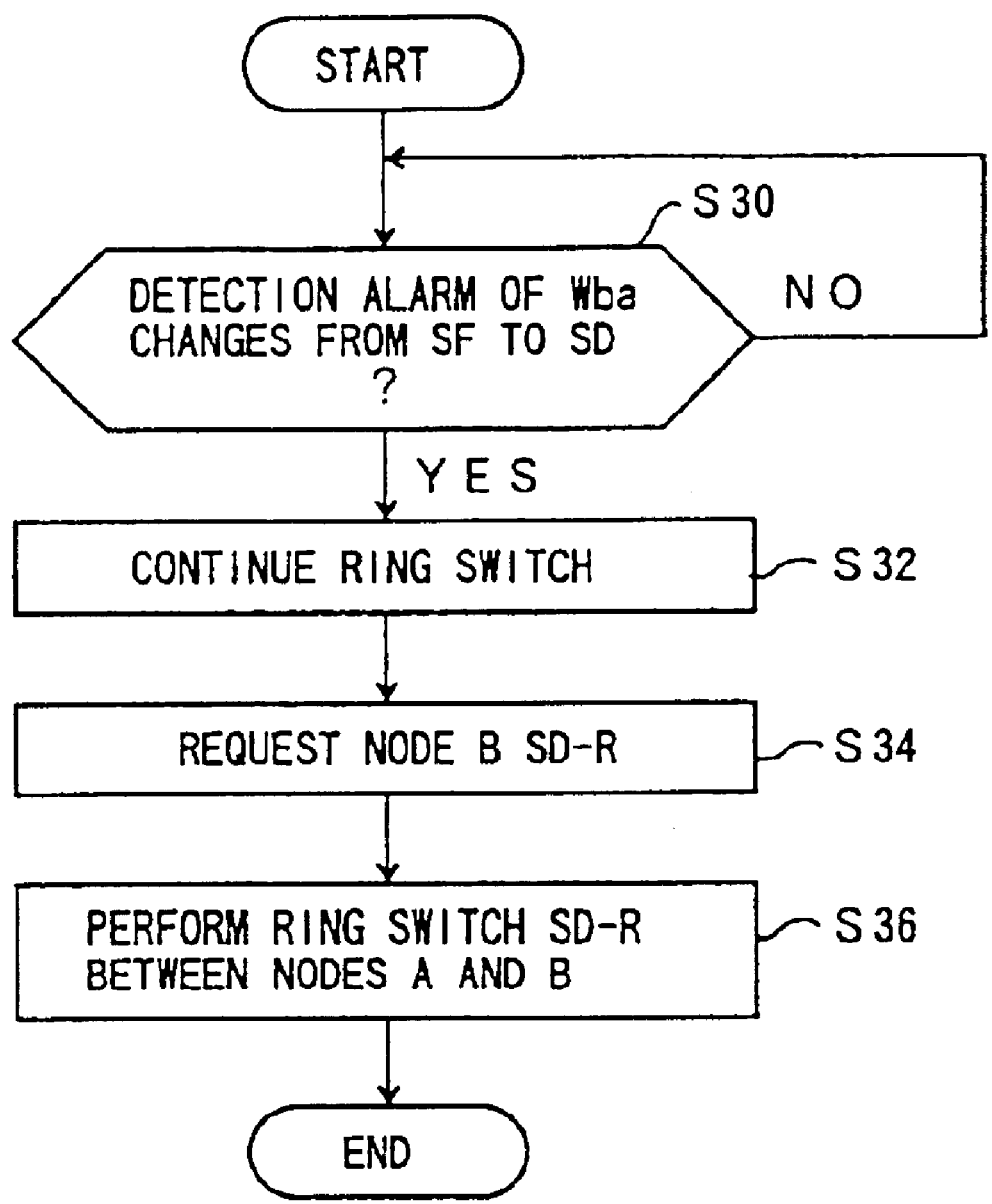
FIG. 14 shows a flow chart performed by the node A at a time of occurrence of change in detection alarm during performance of ring switch between the nodes A and B according to the present invention

FIG. 14 shows a flow chart of a process performed by the node A when detection alarm changes during performance of ring switch between the nodes A and B.

In FIG. 14, in a step S30, when the node A detects that the detection alarm level of the working line Wba from the node B changes from serious SF to slight SD, the node A continues the ring switch in a step S32.

In a step S34, the node A transmits APS information a11 and a12 of ring switch (SD-R) to the nodes B and F. In a step S36, the node A receives APS information b10 of response RR-R, and performs ring switch by SD (SD-R) between the nodes A and B.

Thus, when the fault alarm level detected by the own node changes during performance of ring switch, ring switch according to the fault alarm level after the change is performed, and switching between ring switch and span switch is not performed. Accordingly, it is possible to prevent useless switching operation from frequently occurring.

Figure 15:
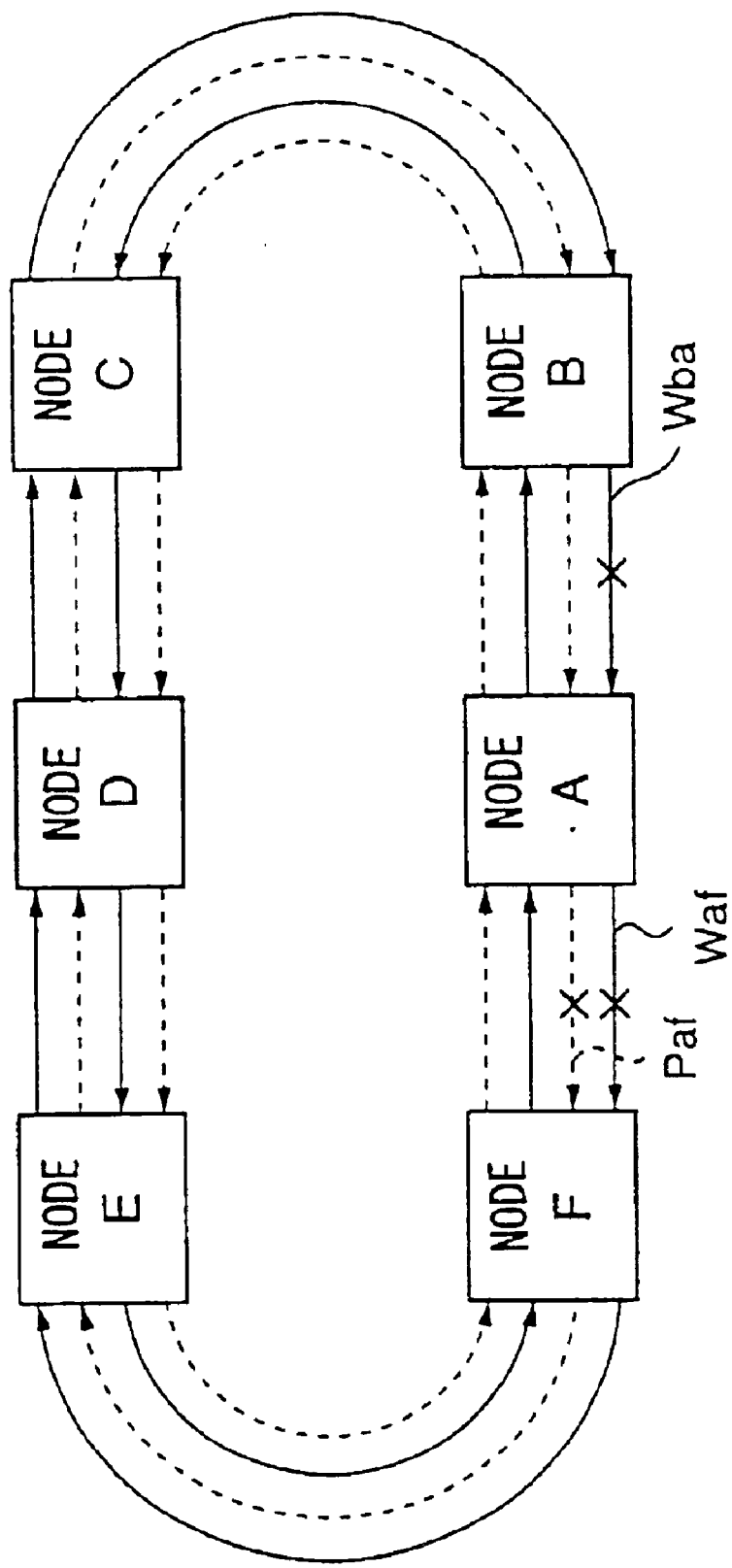
FIG. 15 shows the configuration shown in FIG. 3 but also having other line faults.
Figure 16:
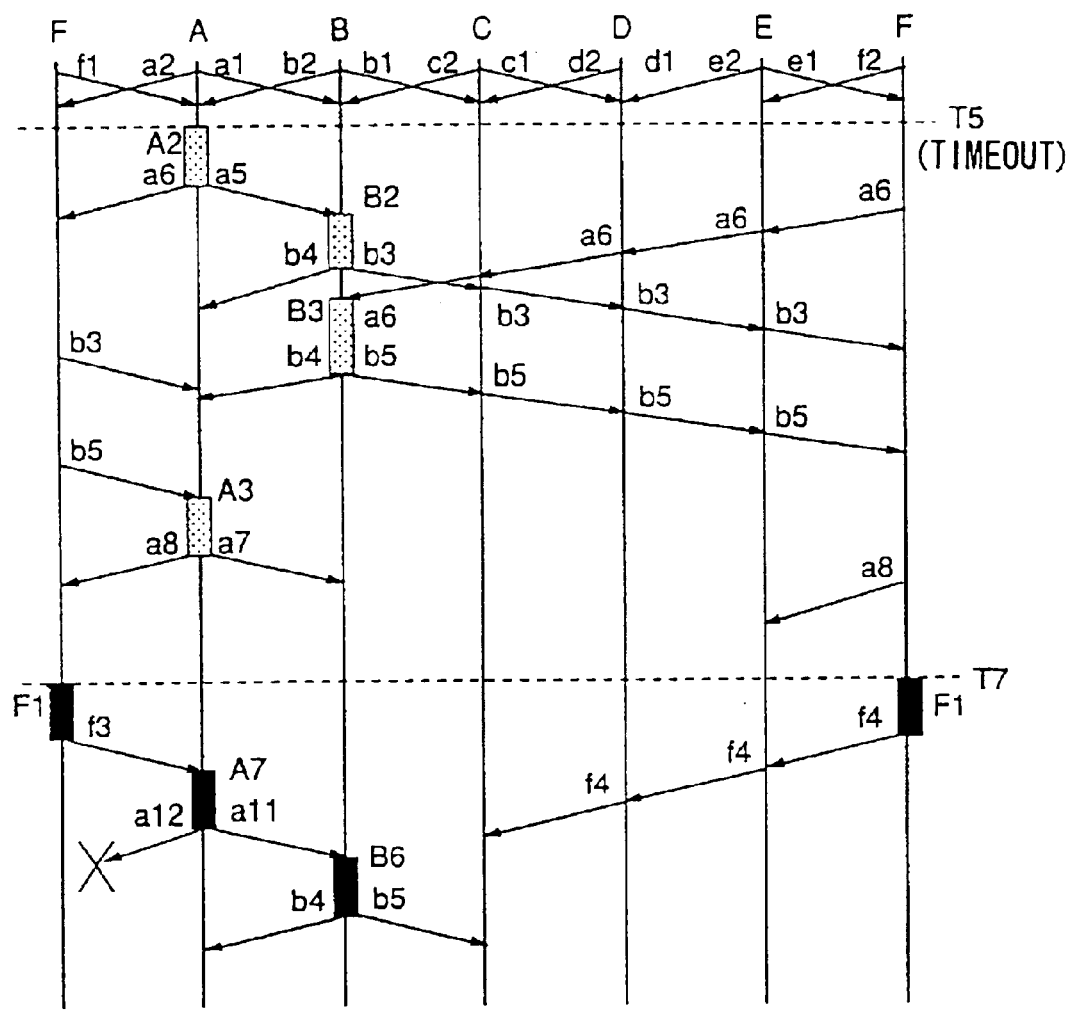
FIG. 16 shows an operation sequence in a fourth embodiment at a time of fault occurring between nodes A and F according to the present invention.

A case where, in the condition in which the serous fault exists between the nodes A and B in the working line Wba shown in FIG. 3, a serious fault occurs in the working line Waf and protection line Paf between the nodes A and F indicated by 'X' in FIG. 15 will now be described. FIG. 16 shows an; operation sequence in a fourth embodiment performed when a fault occur in the nodes A and F according to the present invention. FIG. 17 shows a list of APS information in this case.

The process from the time T5 to the time T7 in FIG. 16 is the same as the process from the time T5 to the time T6 in FIG. 12, and the list of APS information in this time is the same as those of FIGS. 6A and 6B.

When the time T7 is reached in FIG. 16, the node F detects a serious fault SF in the working line Waf and protection line Paf from the node A. Thereby, the node F performs ring switch (operates the ring bridge and ring switch), and transmits APS information f3 and f4 of ring switch (SF-R) shown in FIG. 17.

When receiving the APS information f3 of ring switch (SF-R), the node A cancels ring switch (returns the ring bridge and ring switch), and changes into an isolated condition. Then, the node A transmits APS information a11 and a12 of ring switch (SF-R) to the nodes B and F, respectively.

Figure 18:
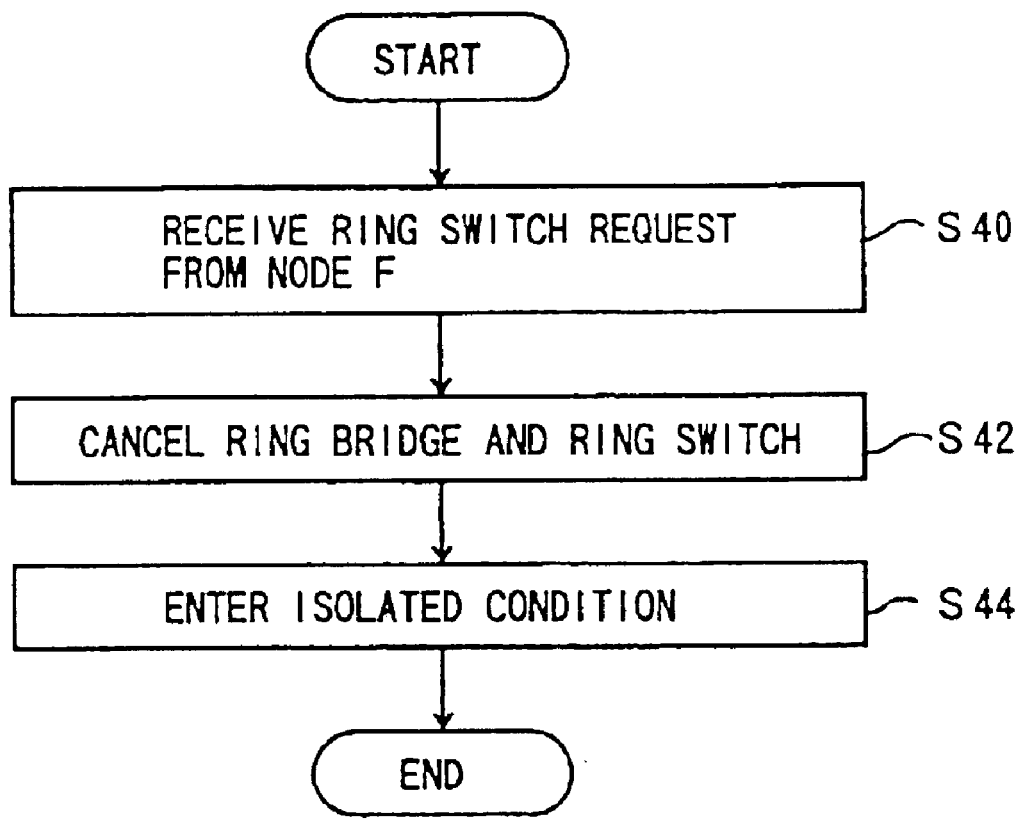
FIG. 18 shows a flow chart performed by the node A at a time of fault occurring between the nodes A and F during performance of ring switch between the nodes A and B according to the present invention.

FIG. 18 shows a flow chart of a process performed by the node A when a fault occurs between the nodes A and F during performance of ring switch between the nodes A and B.

In FIG. 18, in a step S40, the node A receives APS information f3 of ring switch (SF-R) from the node F. Thereby, in a step S42, the node A cancels ring switch (returns the ring bridge and ring switch), and enters an isolated condition in a step S44.

Figure 19:
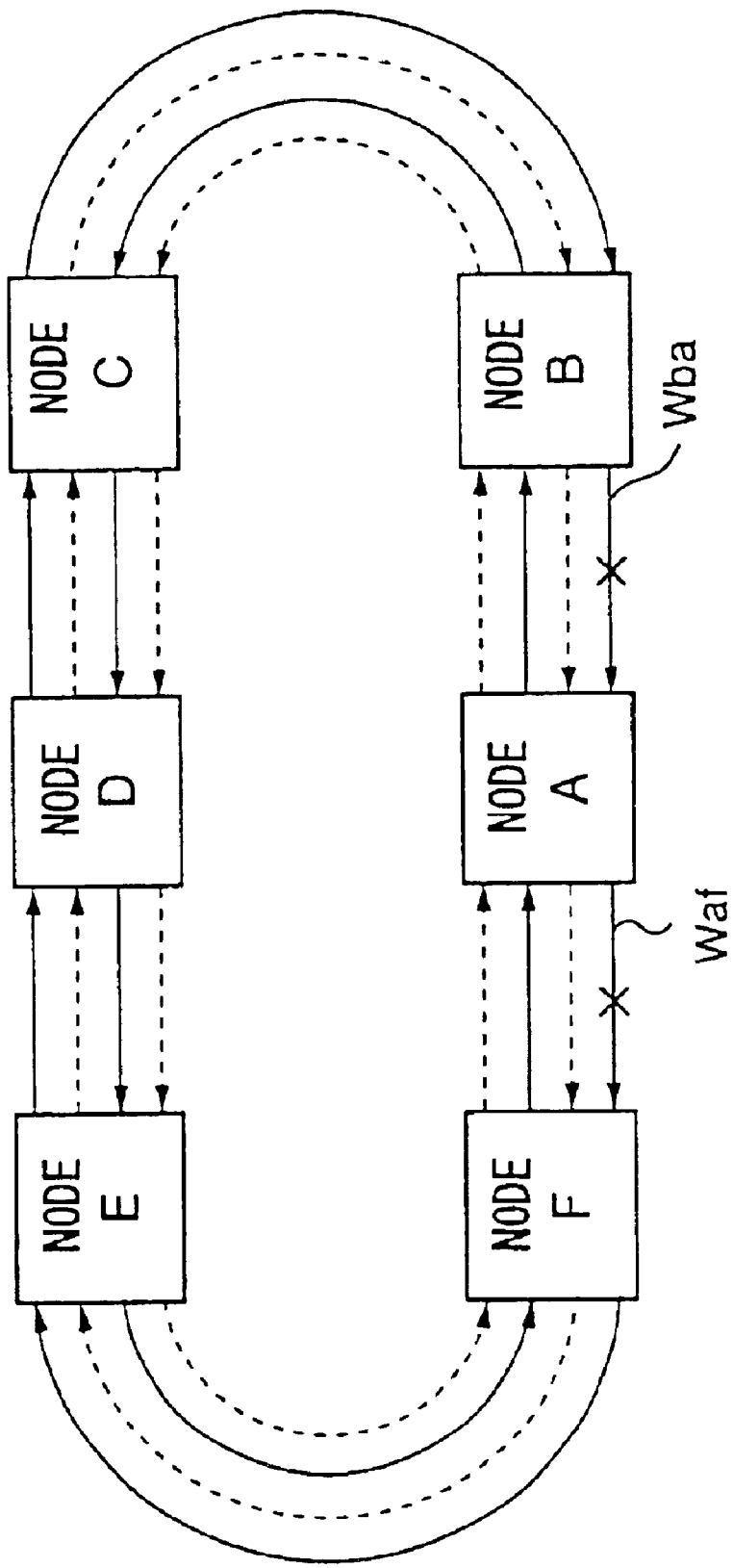
FIG. 19 shows the configuration shown in FIG. 3 but also having another line fault.

A case where a serious fault occurs in the working line Wba between the nodes A and B, and, then, a serious fault also occurs in the working line Waf between the nodes A and F shown in FIG. 19 by 'X' will now be described.

Figure 20:
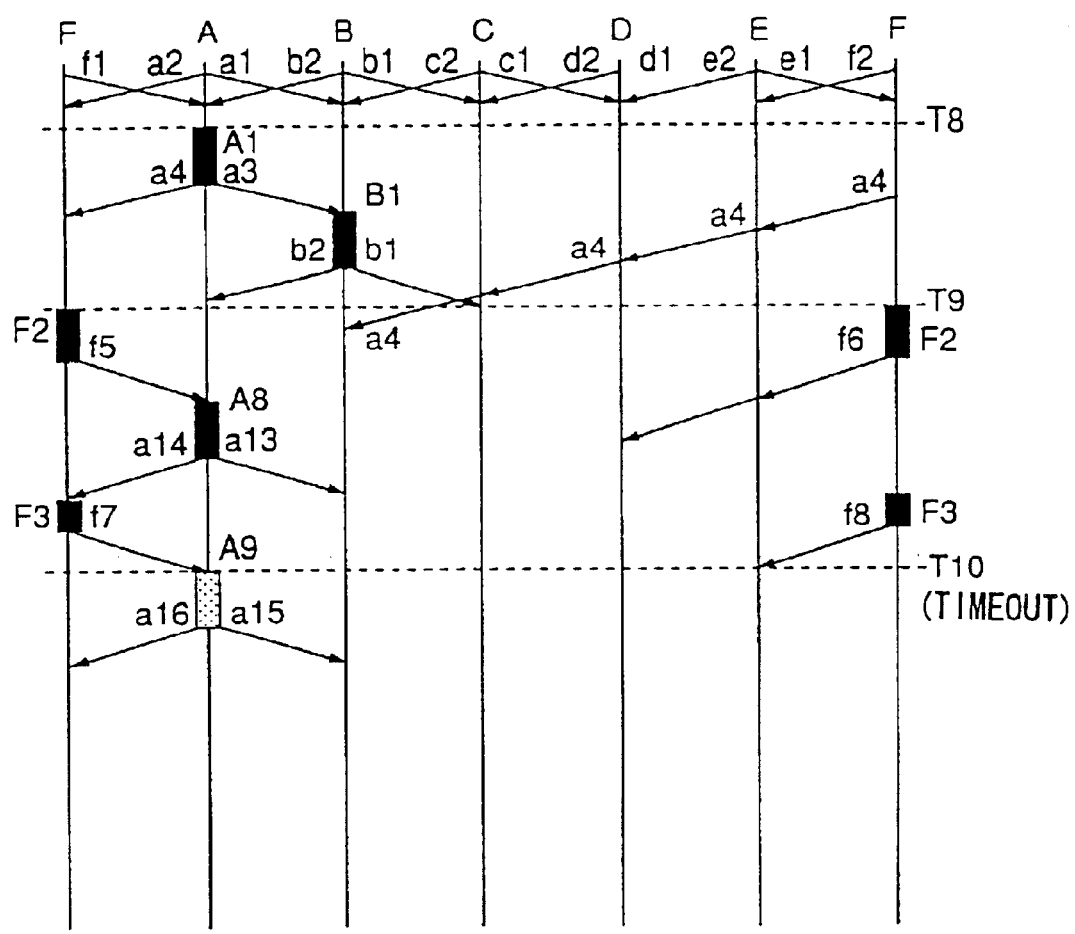
FIG. 20 shows an operation sequence in a fifth embodiment at a time of fault occurring between the nodes A and F according to the present invention.

FIG. 20 shows an operation sequence in a fifth embodiment performed when a fault occurs between the nodes A and F. FIG. 21 shows a list of APS information thereof.

At the time T8 in FIG. 20, the node A detects a serious fault SF in the working line Wba from the node B, performs span switch (SF-S), and transmits APS information a3 and a4 of span switch (SF-S) request shown in FIG. 6B to the adjacent nodes B and F. However, the node A receives APS information b2 of 'NR' shown in FIG. 6A, and does not receive response to reception of the span switch (SF-S) request.

Then, the time T9 is reached, the node F detects a serious fault SF in the working line Waf from the node A, performs span switch (SF-S), and transmits APS information f5 and f6 of span switch (SF-S) request shown in FIG. 21 to the adjacent nodes A and E.

When receiving the APS information f5, the node A performs span switch (operates the span bridge), and transmits APS information a13 of span switch (SF-S) request and APS information a14 of span switch (SF-S) response to the nodes B and F.

As a result of receiving the APS information a14 of span switch (SF-S) response from the node A, the node F performs span switch (operates the span bridge and span switch), and transmits APS information f7 and f8 of span switch (SF-S) request shown in FIG. 21 to the nodes A and E.

Then, when the time T10 is reached, the node A understands that span switch which the node A attempts to perform between the nodes A and B cannot be performed, and attempts to perform ring switch (SF-R).

However, because the APS information f7 of span switch (SF-S) request higher in the priority is received from the node F, the node A transmits APS information a15 of span switch (SF-S) request and APS information a16 of span switch (SF-S) response of the side of the node F to the nodes B and F.

Figure 22:
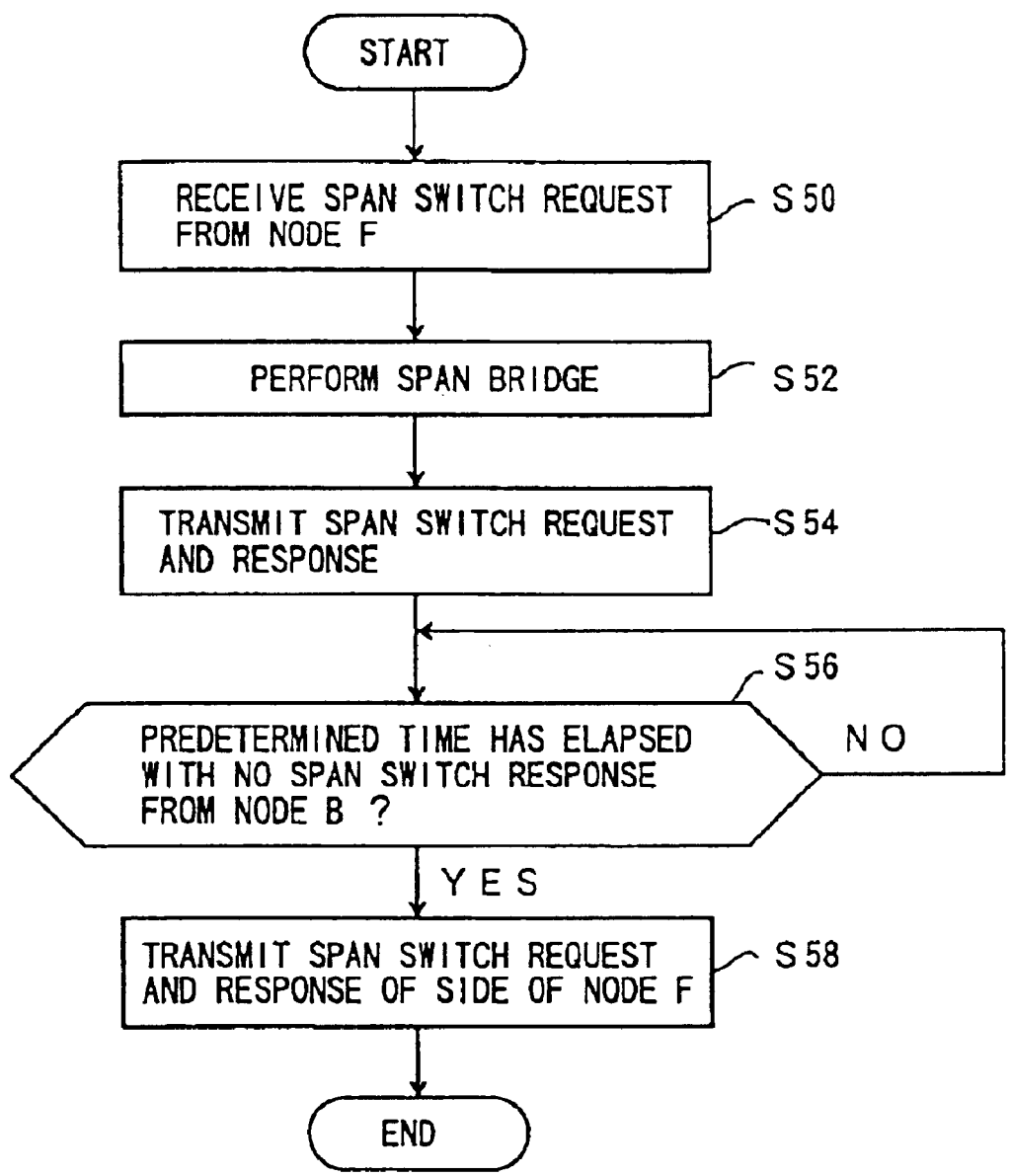
FIG. 22 shows a flow chart performed by the node A at a time of fault occurring between the nodes A and F during performance of ring switch between the nodes A and B according to the present invention.

FIG. 22 shows a flow chart of a process performed by the node A when a fault occurs between the nodes A and F while ring switch is on performance between the nodes A and B.

In FIG. 22, in a step S50, the node A receives APS information f5 of span switch (SF-S) from the node F. Thereby, the node A performs span switch (operates the span bridge) in a step S52, and transmits APS information a13 of span switch (SF-S) and APS information a14 of response to the nodes B and F in a step S54.

Then, in a step S56, the node A determines whether a predetermined time has elapsed without response to span switch given by the node B. When the predetermined time has elapsed, a step S58 is performed.

In the step S58, because APS information f7 of span switch (SF-S) request higher in the priority than ring switch (SF-R) which the node A attempts to perform is received from the node F, the node A transmits APS information a15 of span switch (SF-S) request and APS information a16 of span switch (SF-S) response of the side of the node F to the nodes B and F.

Thus, when span switch between the own node and the adjacent node on one side cannot be performed, and is changed into ring switch, the own node compares the priority between the ring switch request for the node on the one side and span switch request for the node on the other side.

Then, the own node determines whether the ring switch or span switch is to be performed, and information is transmitted to the nodes on both sides based on the determination.

Accordingly, it is possible to stabilize APS information and switching operation.

The present invention is not limited to the above-described embodiments, and variations and modifications may be made without departing from the scope of the present invention.

The present application is based on Japanese priority application no. 11-371615, filed on Dec. 27, 1999, the entire contents of which are hereby incorporated by reference.

What is claimed is:

1. A switching method for a multi-fiber bidirectional line switched ring comprising the steps of:
    a) performing a span switch by one node of said ring for getting rid of a fault detected by said one node;
    b) changing the span switch into a ring switch when the span switch can not be performed normally, and performing the ring switch; and
    c) holding a ring switch request as an internal request of said one node when a span switch request, received by said one node is higher in priority than the ring switch, the span switch request being generated in another node.

2. The switching method as claimed in claim 1, further comprising the step of:
    d) when information indicating that the span switch request higher in the priority has come to be absent is received by the one node, restarting from span switch for getting rid of the fault detected by said one node.

3. The switching method as claimed in claim 1, further comprising the step of:
    d) when a fault alarm level received by the one node is changed during performance of the ring switch, performing ring switch according to a new fault alarm level.

4. The switching method as claimed in claim 1, further comprising the step of:
    d) when, from another node adjacent on a side reverse to a side on which the ring switch is performed, ring switch request for the one node is received, isolating said one node from the ring.

5. The switching method as claimed in claim 1, further comprising the step of:
    d) when span switch request higher in the priority than the ring switch is received by the one node, canceling the ring switch operation of said one node, causing the received span switch request to pass through said one node so as to be transmitted to an adjacent node.

6. The switching method as claimed in claim 1, further comprising the step of:
    d) when span switch is attempted to be performed between the one node and each of adjacent nodes on both sides, but the span switch between said one node and the one adjacent node on one side cannot be performed so as to be changed into ring switch, comparing by said one node the priority between the span switch request for the other adjacent node and the ring switch request for said one adjacent node so as to determine whether the span switch or ring switch is to be performed, and sending request to the adjacent nodes on both sides based on the result of the determination.

7. A node apparatus used in a four-fiber bidirectional line switched ring comprising:
    a part performing a span switch for getting rid of a fault detected by one node apparatus;
    a part changing the span switch into a ring switch when the span switch cannot be performed normally, and performing the ring switch; and
    a part holding a ring switch request as an internal request of said one node apparatus when a span switch request; received by said one node is higher in priority than the ring switch request, the span switch request being generated in another node apparatus.

8. The node apparatus as claimed in claim 7, further comprising:
    a part, when information indicating that the span switch request higher in the priority has come to be absent is received, restarting from span switch for getting rid of the detected fault.

9. The node apparatus as claimed in claim 7, further comprising:
    a part, when a received fault alarm level is changed into another fault alarm level during performance of the ring switch, performing ring switch according to the another fault alarm level.

10. The node apparatus as claimed in claim 7, further comprising:
    a part, when, from another node apparatus adjacent on a side reverse to a side on which the ring switch is performed, ring switch request for the own node apparatus is received, isolating said own node apparatus from the ring.

11. The node apparatus as claimed in claim 7, further comprising:
    a part, when span switch request higher in the priority than the ring switch is received by the own node apparatus, canceling the ring switch operation of said own node apparatus, and causing the received span switch request to pass through said own node apparatus so as to be transmitted to an adjacent node apparatus.

12. The node apparatus as claimed in claim 7, further comprising:
    a part, when span switch is attempted to be performed between the own node apparatus and each of adjacent node apparatuses on both sides, but the span switch between said own node apparatus and the one adjacent node apparatus cannot be performed so as to be changed into ring switch, comprising the priority between the span switch request for the other adjacent node apparatus and the ring switch request for said one adjacent node apparatus so as to determine whether the span switch or ring switch is to be performed, and sending request to the adjacent node apparatuses on both sides based on the result of the determination.

* * * * *